United States Patent
Nallagatla et al.

(10) Patent No.: US 9,395,968 B1
(45) Date of Patent: Jul. 19, 2016

(54) UNIQUELY IDENTIFYING AND VALIDATING COMPUTER SYSTEM FIRMWARE

(75) Inventors: Purandhar Nallagatla, Duluth, GA (US); Harikrishna Doppalapudi, Tenali (IN)

(73) Assignee: American Megatrends, Inc., Norcross, GA (US)

( * ) Notice: Subject to any disclaimer, the term of this patent is extended or adjusted under 35 U.S.C. 154(b) by 1151 days.

(21) Appl. No.: 11/478,981

(22) Filed: Jun. 30, 2006

(51) Int. Cl.
*G06F 9/445* (2006.01)

(52) U.S. Cl.
CPC .................................. *G06F 8/61* (2013.01)

(58) Field of Classification Search
None
See application file for complete search history.

(56) References Cited

U.S. PATENT DOCUMENTS

| | | | |
|---|---|---|---|
| 5,210,854 A | 5/1993 | Beaverton et al. | |
| 5,623,604 A | 4/1997 | Russell et al. | |
| 6,081,850 A * | 6/2000 | Garney | 710/15 |
| 6,167,567 A * | 12/2000 | Chiles et al. | 717/173 |
| 6,253,300 B1 | 6/2001 | Lawrence et al. | |
| 6,360,362 B1 | 3/2002 | Fichtner et al. | |
| 6,415,435 B1 * | 7/2002 | McIntyre | G06F 8/76 707/999.103 |
| 6,581,157 B1 | 6/2003 | Chiles et al. | |
| 6,604,236 B1 * | 8/2003 | Draper et al. | 717/170 |
| 6,631,520 B1 | 10/2003 | Theron et al. | |
| 6,640,334 B1 | 10/2003 | Rasmussen | |
| 6,678,741 B1 | 1/2004 | Northcutt et al. | |
| 6,721,489 B1 * | 4/2004 | Benyamin et al. | 386/243 |
| 6,836,885 B1 | 12/2004 | Buswell et al. | |
| 6,898,768 B1 * | 5/2005 | Theodossy et al. | 716/111 |
| 6,944,854 B2 | 9/2005 | Kehne et al. | |
| 6,954,929 B2 | 10/2005 | Erikson et al. | |
| 6,976,163 B1 | 12/2005 | Hind et al. | |
| 7,007,159 B2 | 2/2006 | Wyatt | |
| 7,055,148 B2 | 5/2006 | Marsh et al. | |
| 7,069,452 B1 | 6/2006 | Hind et al. | |
| 7,089,547 B2 * | 8/2006 | Goodman et al. | 717/168 |
| 7,127,599 B2 | 10/2006 | Brice et al. | |
| 7,146,609 B2 | 12/2006 | Thurston et al. | |
| 7,171,658 B2 | 1/2007 | Ha | |
| 7,178,141 B2 | 2/2007 | Piazza | |
| 7,203,723 B2 | 4/2007 | Ogawa | |
| 7,243,347 B2 | 7/2007 | Palmer et al. | |
| 7,284,085 B2 | 10/2007 | Netter et al. | |
| 7,299,463 B2 | 11/2007 | Brannock et al. | |

(Continued)

OTHER PUBLICATIONS

U.S. Appl. No. 11/479,923, filed Jun. 30, 2006, entitled "Dynamically Updating a Computer System and Computer System Firmware Image Utilizing an Option ROM Data Structure," Inventors: Nallagatla et al.

(Continued)

*Primary Examiner* — Jason Mitchell
(74) *Attorney, Agent, or Firm* — Lee & Hayes, PLLC (57) ABSTRACT

Methods, apparatus, computer systems, and computer-readable media for creating a firmware identification data structure in a memory device for identifying and validating a firmware are provided. According to one method, a signature, globally unique identifier, and data module category version identifiers are stored in data fields within the data structure. Major and minor version identifiers are modified as corresponding firmware program modules are modified. For validation, a memory device is searched for the signature identifying a firmware identification data structure. The firmware GUID and version identifiers stored within the data structure are used for firmware validation.

20 Claims, 8 Drawing Sheets

(56) References Cited

U.S. PATENT DOCUMENTS

| | | | |
|---|---|---|---|
| 7,305,668 | B2 | 12/2007 | Kennedy et al. |
| 7,313,685 | B2 | 12/2007 | Broyles et al. |
| 7,337,309 | B2 * | 2/2008 | Nguyen et al. ............... 713/1 |
| 7,373,432 | B2 | 5/2008 | Rapp et al. |
| 7,376,943 | B2 | 5/2008 | Lu |
| 7,376,944 | B2 | 5/2008 | Crisan et al. |
| 7,409,685 | B2 | 8/2008 | Chen et al. |
| 7,421,688 | B1 | 9/2008 | Righi et al. |
| 7,480,907 | B1 | 1/2009 | Marolia et al. |
| 7,516,450 | B2 * | 4/2009 | Ogura ......................... 717/168 |
| 7,543,048 | B2 | 6/2009 | Rothman et al. |
| 7,555,750 | B1 | 6/2009 | Lilley |
| 7,558,867 | B2 | 7/2009 | Le et al. |
| 7,590,835 | B1 | 9/2009 | Nallagatla et al. |
| 7,657,886 | B1 | 2/2010 | Chen et al. |
| 7,774,596 | B2 * | 8/2010 | Flynn ........................... 713/161 |
| 7,797,696 | B1 | 9/2010 | Nallagatla et al. |
| 7,814,474 | B2 | 10/2010 | Chen et al. |
| 8,032,881 | B2 | 10/2011 | Holmberg et al. |
| 8,037,198 | B2 | 10/2011 | Le et al. |
| 8,136,108 | B2 | 3/2012 | Ha et al. |
| 8,229,227 | B2 | 7/2012 | Stojancic et al. |
| 8,261,256 | B1 | 9/2012 | Adler et al. |
| 8,600,726 | B1 * | 12/2013 | Varshney et al. ............... 703/26 |
| 2001/0042243 | A1 | 11/2001 | Fish et al. |
| 2002/0087877 | A1 * | 7/2002 | Grawrock .................... 713/200 |
| 2002/0138567 | A1 * | 9/2002 | Ogawa ......................... 709/203 |
| 2002/0194313 | A1 * | 12/2002 | Brannock ................. G06F 8/65 709/220 |
| 2003/0093716 | A1 * | 5/2003 | Farchi ................. G06F 11/3676 714/34 |
| 2003/0142351 | A1 * | 7/2003 | Sakura ......................... 358/1.15 |
| 2003/0145008 | A1 * | 7/2003 | Burrell ......................... 707/100 |
| 2003/0217193 | A1 | 11/2003 | Thurston et al. |
| 2004/0003265 | A1 * | 1/2004 | Freeman et al. ............. 713/191 |
| 2004/0030875 | A1 * | 2/2004 | Qureshi et al. ................... 713/1 |
| 2004/0103412 | A1 * | 5/2004 | Rao ..................... G06F 11/1433 717/171 |
| 2004/0148379 | A1 * | 7/2004 | Ogura ......................... 709/223 |
| 2004/0158828 | A1 * | 8/2004 | Zimmer et al. ............... 717/168 |
| 2004/0162975 | A1 * | 8/2004 | Yakovlev ......................... 713/1 |
| 2004/0162976 | A1 * | 8/2004 | Yakovlev ......................... 713/1 |
| 2004/0210582 | A1 * | 10/2004 | Chatterjee et al. ............... 707/9 |
| 2005/0108700 | A1 * | 5/2005 | Chen et al. .................... 717/168 |
| 2005/0120384 | A1 * | 6/2005 | Stone et al. ................... 725/132 |
| 2005/0125489 | A1 * | 6/2005 | Hanes .......................... 709/202 |
| 2005/0141025 | A1 * | 6/2005 | Hanada ........................ 358/1.15 |
| 2006/0107032 | A1 * | 5/2006 | Paaske et al. .................... 713/2 |
| 2006/0122945 | A1 | 6/2006 | Ripberger et al. |
| 2007/0055794 | A1 | 3/2007 | Chuang et al. |
| 2007/0214453 | A1 * | 9/2007 | Dive-Reclus ................. 717/175 |
| 2007/0274230 | A1 | 11/2007 | Werber et al. |
| 2008/0028046 | A1 * | 1/2008 | Ushiki .......................... 709/219 |
| 2009/0235242 | A1 * | 9/2009 | Kawaguchi ................... 717/168 |

OTHER PUBLICATIONS

U.S. Appl. No. 11/479,725, filed Jun. 30, 2006, entitled "Dynamically Updating a Computer System Firmware Image," Inventors: Nallagatla et al.

U.S. Official Action dated Jan. 2, 2009 in U.S. Appl. No. 11/479,725.

U.S. Official Action dated Nov. 25, 2009 in U.S. Appl. No. 11/479,923.

U.S. Notice of Allowance / Allowability dated May 19, 2009 in U.S. Appl. No. 11/479,725.

U.S. Appl. No. 12/539,132, filed Aug. 3, 2010 entitled "Dynamically Updating a Computer System Firmware Image," Inventors: Nallagatla et al.

U.S. Appl. No. 12/849,347, filed, Aug. 3, 2010 entitled "Dynamically Updating a Computer System and Firmware Image Utilizing an Option Read Only Memory (OPROM) Data Structure," Inventors: Nallagatla et al.

U.S. Official Action dated Aug. 13, 2012 in U.S. Appl. No. 12/539,132, filed Aug. 11, 2009, First Named Inventor: Purandhar Nallagatla.

U.S. Notice of Allowance / Allowability dated May 4, 2010 in U.S. Appl. No. 11/479,923.

Cieslicki et al., "Efficient updates in highly available distributed random access memory," 2006, IEEE, ICPADS, pp. 1-6.

Kim et al., "Remote progressive firmware update for flash based networked embedded systems," 2009, ACM ISLPED, pp. 407-412.

Kumar et al., "Dynamic memory management for programmable devices," 2002, ACM ISMM, pp. 139-149.

Tiwari et al., "A small cache of large ranges: Hardware methods for efficiently searching, storing and updating big dataflow tags," 2008, IEEE, pp. 94-105.

U.S. Notice of Allowance/Allowability dated May 24, 2013 in U.S. Appl. No. 12/539,132, filed Aug. 11, 2009, First Named Inventor: Purandhar Nallagatla.

U.S. Notice of Allowance/Allowability dated Jun. 4, 2013 in U.S. Appl. No. 12/849,347, filed Aug. 3, 2010, First Named Inventor: Purandhar Nallagatla.

Aroya et al., "Competitive Analysis of Flash Memory Algorithms", ACM Trans. on Algorithms, 2011, vol. 7, Article 2, pp. 1-23.

Chen et al., "Understanding Intrinsic Characteristics and System Implication of Flash Memory Based Solid State Drives", ACM, 2009, pp. 181-192.

Bencsath et al., "XCS Based Hidden Firmware Modification on Embedded Devices", IEEE 2011, pp. 1-5.

Dong et al., "FEMU a Firmware Based Emulation Framework for SoC Verification", ACM 2010, pp. 257-266.

U.S. Official Action dated Feb. 4, 2013 in U.S. Appl. No. 12/539,132, filed Aug. 11, 2009, First Named Inventor: Purandhar Nallagatla.

U.S. Official Action dated Dec. 17, 2012 in U.S. Appl. No. 12/849,347, filed Aug. 3, 2010, First Named Inventor: Purandhar Nallagatla.

* cited by examiner

| | FIELD | DATA TYPE | |
|---|---|---|---|
| 420 | FIRMWARE ID [4] | CHAR 8 | 446 |
| 422 | STRUCT VERSION | UINT 8 | 448 |
| 424 | SIZE | UINT 16 | 450 |
| 426 | BIOS TAG [9] | CHAR 8 | 452 |
| 428 | FIRMWARE GUID | EFI_GUID | 454 |
| 430 | CORE MAJOR VERSION | CHAR 8 | 456 |
| 432 | CORE MINOR VERSION | CHAR 8 | 458 |
| 434 | CHIPSET MAJOR VERSION | CHAR 8 | 460 |
| 436 | CHIPSET MINOR VERSION | CHAR 8 | 462 |
| 438 | PLATFORM MAJOR VERSION | CHAR 8 | 464 |
| 440 | PLATFORM MINOR VERSION | CHAR 8 | 466 |
| 442 | DATE STAMP | CHAR 8 | 468 |
| 444 | TIME STAMP | CHAR 8 | 470 |

UNIQUELY IDENTIFYING AND VALIDATING COMPUTER SYSTEM FIRMWARE

CROSS-REFERENCE TO RELATED APPLICATIONS

This application is related to U.S. Pat. No. 7,590,835 entitled "Dynamically Updating a Computer System Firmware Image" issued on Sep. 15, 2009 and U.S. Pat. No. 7,797,696 entitled "Dynamically Updating a Computer System and Firmware Image Utilizing an Option Read Only Memory (OPROM) Data Structure" issued on Sep. 14, 2010, which are both expressly incorporated herein by reference in their entirety.

BACKGROUND

Computing systems often use a non-volatile memory device, such as a read-only memory ("ROM") device or a non-volatile random access memory ("NVRAM") device, to store the system firmware. The firmware provides program code for performing power-on self tests, booting, and for providing support to the operating system and other functions.

When computer systems are designed, there are many different combinations of hardware devices that may be present in the computer system. To support such a wide variety of hardware combinations, the firmware is customized for each particular implementation. In particular, firmware program modules may be added to the firmware, interchanged, or modified according to specific hardware configurations. As various hardware components are added or removed from a computer system motherboard, the firmware must be updated to reflect the configuration change in order for the firmware program modules to properly interact. Because there can be many different hardware combinations, there will also be a corresponding number of different firmware versions. It can be difficult to keep track of the different firmware versions.

It is with respect to these considerations and others that the various embodiments of the invention have been made.

SUMMARY

In accordance with the present embodiments disclosed herein, the above and other problems are solved by methods, apparatus, systems, and computer-readable media for identifying and validating firmware. Through the embodiments, a firmware identification data structure facilitates firmware version identification and validation by the firmware program modules.

According to one implementation described herein, a method is provided for creating a firmware identification data structure in a memory device for uniquely identifying the combination of firmware program modules in a firmware. According to the method, a data structure signature is stored in the firmware identification data structure. The data structure signature identifies the firmware identification data structure. Major version minor version identifiers are also stored in the firmware identification data structure. Each major version identifier corresponds to a current major version of a category of firmware program modules. Similarly, each minor version identifier corresponds to a current minor version of a category of firmware program modules.

According to other aspects of the method, it is determined whether a firmware program module has been modified, and if so, the contents of the firmware identification data structure are modified to reflect the modification. If the modification is a major modification, the major version identifier corresponding to the applicable category of firmware program modules is modified. If the modification is not a major modification, the minor version identifier corresponding to the applicable category of firmware program modules is modified.

According to another aspect, a method is provided for validating a computer system firmware utilizing a firmware identification data structure. According to the method, a memory device is searched for a firmware data structure signature associated with the firmware identification data structure. The firmware identification data structure identified by the located data structure signature is retrieved. The firmware identification is determined from a firmware globally unique identifier ("GUID") stored within the data structure. The method further includes determining a current version of a category of firmware program modules within the firmware. This determination is made utilizing at least one version identifier stored within the firmware identification data structure. The functionality provided by the firmware program modules may be modified based on the firmware GUID and version identifier.

According to yet another aspect, a method is provided for modifying a firmware identification data structure in response to modifying a firmware. According to the method, a determination is made as to whether the modification to the firmware is a major modification. If the modification is major, then a major version identifier is modified. The major version identifier that is modified is associated with a firmware program module category corresponding to a modified firmware program module. If the modification is not major, then a minor version identifier associated with the applicable firmware program module category is modified.

Aspects of the invention may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

The embodiments described herein provide methods, apparatus, systems, and computer-readable media for identifying and validating firmware. In the following detailed description, references are made to the accompanying drawings that form a part hereof, and in which are shown by way of illustration specific embodiments or examples. Referring now to the drawings, in which like numerals represent like elements throughout the several figures, the exemplary operating environment and several illustrative implementations will be described.

Figure 1:
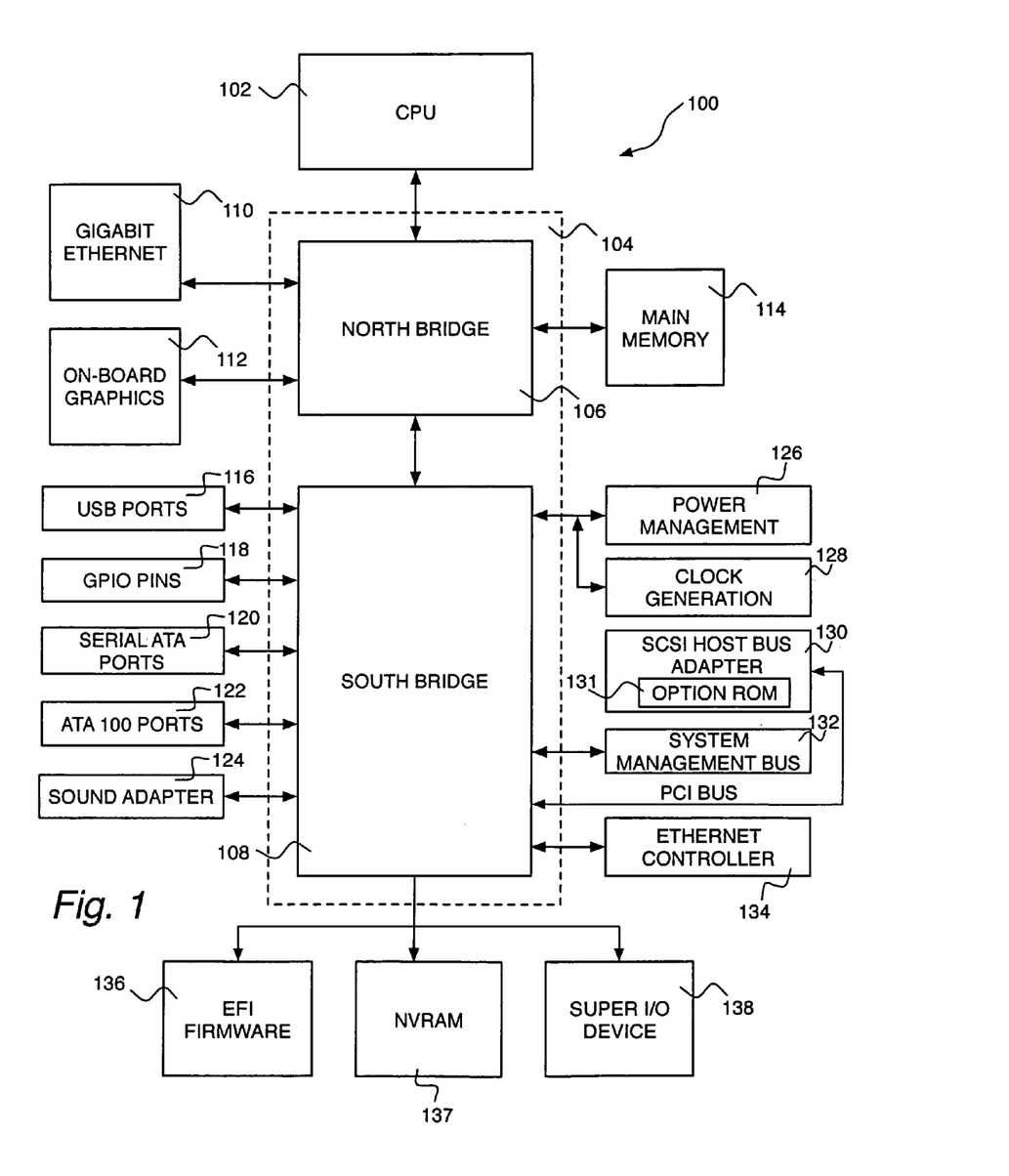
FIG. 1 is a computer architecture diagram that illustrates various components of a computer that provides an illustrative operating environment.

FIG. 1 and the following discussion are intended to provide a brief, general description of a suitable computing environment in which the disclosure presented herein may be implemented. While the embodiments described herein will be described in the general context of program modules that execute in conjunction with the execution of a computer firmware, those skilled in the art will recognize that they may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the disclosure presented herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to enable the creation of a firmware identification data structure that may be used to identify and validate the firmware.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The Extensible Firmware Interface ("EFI") firmware 136 comprises a firmware that is compatible with the EFI specification. Additional details regarding the operation of the EFI firmware 136 are provided below with respect to FIGS. 2-3. The LPC interface may also be utilized to connect a NVRAM 137 to the computer 100. In one embodiment, the NVRAM 137 may be utilized by the firmware 136 to store configuration data and other kinds of data for the computer 100. It should be appreciated that the configuration and other data for the computer 100 may be stored on the same NVRAM device as the firmware 136. It should also be appreciated that the firmware 136 may be stored on ROM or other non-volatile memory device.

According to an embodiment described herein, the CPU 4 may comprise a general purpose microprocessor from INTEL CORPORATION. For instance, the CPU may comprise a PENTIUM 4 or XEON microprocessor from INTEL CORPORATION. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
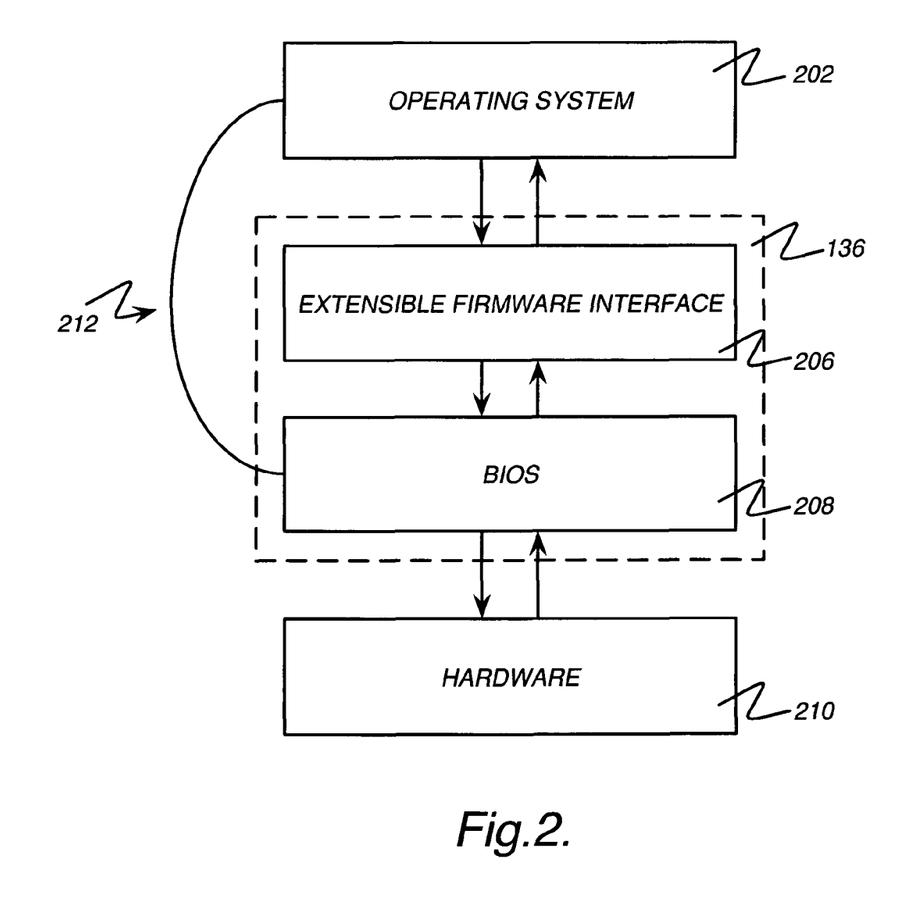
FIGS. 2 and 3 are computer architecture diagrams that illustrate aspects of an EFI environment utilized by the embodiments described herein.

Referring now to FIG. 2, additional details regarding the operation of the EFI firmware 136 of the computer 2 will be described. In most computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been created. The specification is called the Extensible Firmware Interface specification and is available from INTEL CORPORATION. The original EFI specification from INTEL CORPORATION is also being extended by the UNIFIED EXTENSIBLE FIRMWARE INTERFACE FORUM ("UEFI").

The EFI specification describes an interface between the operating system and the system firmware. In particular, the specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others.

As described above, the firmware 136 comprises a firmware compatible with the EFI specification from INTEL CORPORATION or from the UEFI FORUM. The EFI specification describes an interface between the operating system 202 and the system firmware 136. The EFI specification defines the interface that platform firmware must implement, and the interface that the operating system 202 may use in booting. How the firmware 136 implements the interface is left up to the manufacturer of the firmware. The intent of the specification is to define a way for the operating system 202 and firmware 136 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 206 and a BIOS 208 may be present in the firmware 136. This allows users and system integrators to support both firmware interfaces. In order to provide this functionality, an interface 212 may be provided for use by legacy operating systems and applications. Additional details regarding the architecture and operation of the EFI 206 are provided below with respect to FIG. 3. Moreover, additional details regarding the operation and architecture of EFI can be found in the EFI specification which is available from INTEL CORPORATION end expressly incorporated herein by reference.

Figure 3:
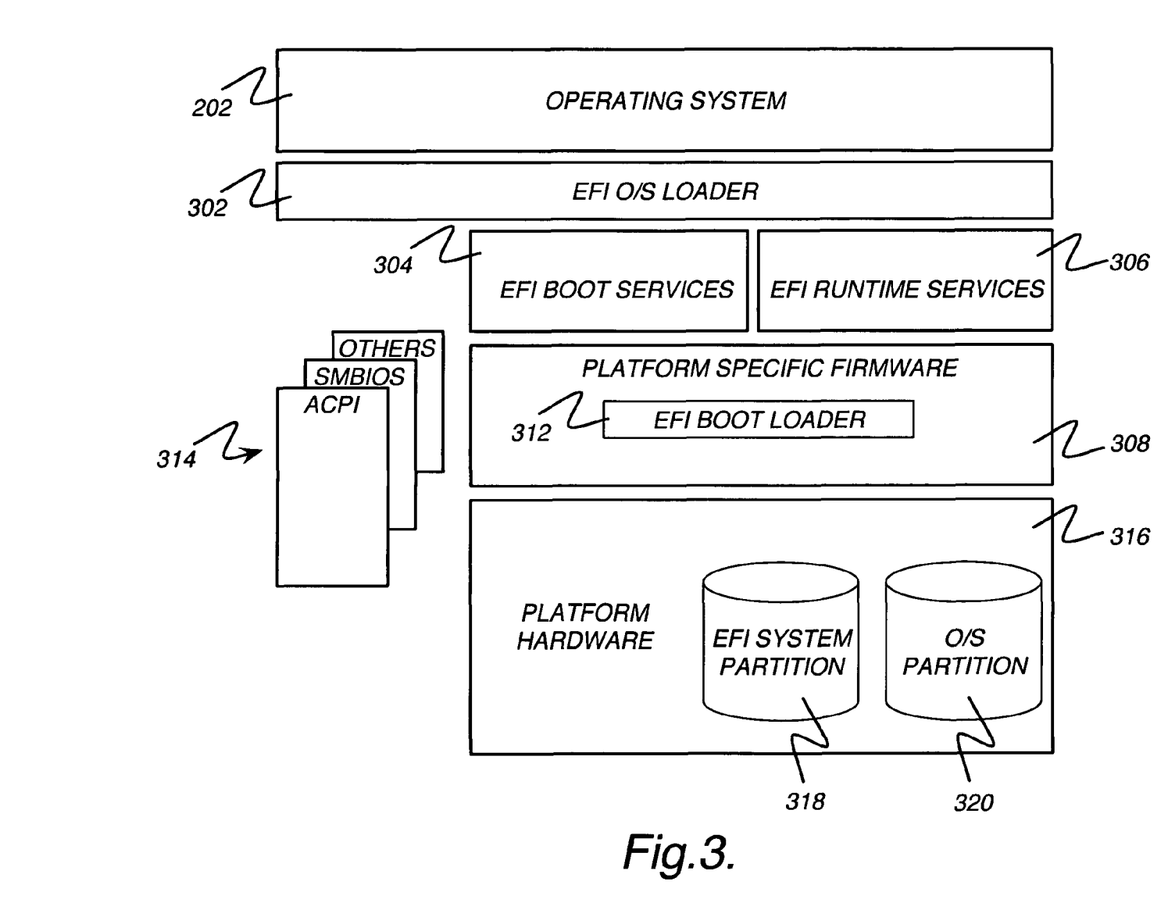

Turning now to FIG. 3, additional details regarding an EFI specification-compliant system utilized to provide an operating environment for the various embodiments will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order.

Figure 4A:
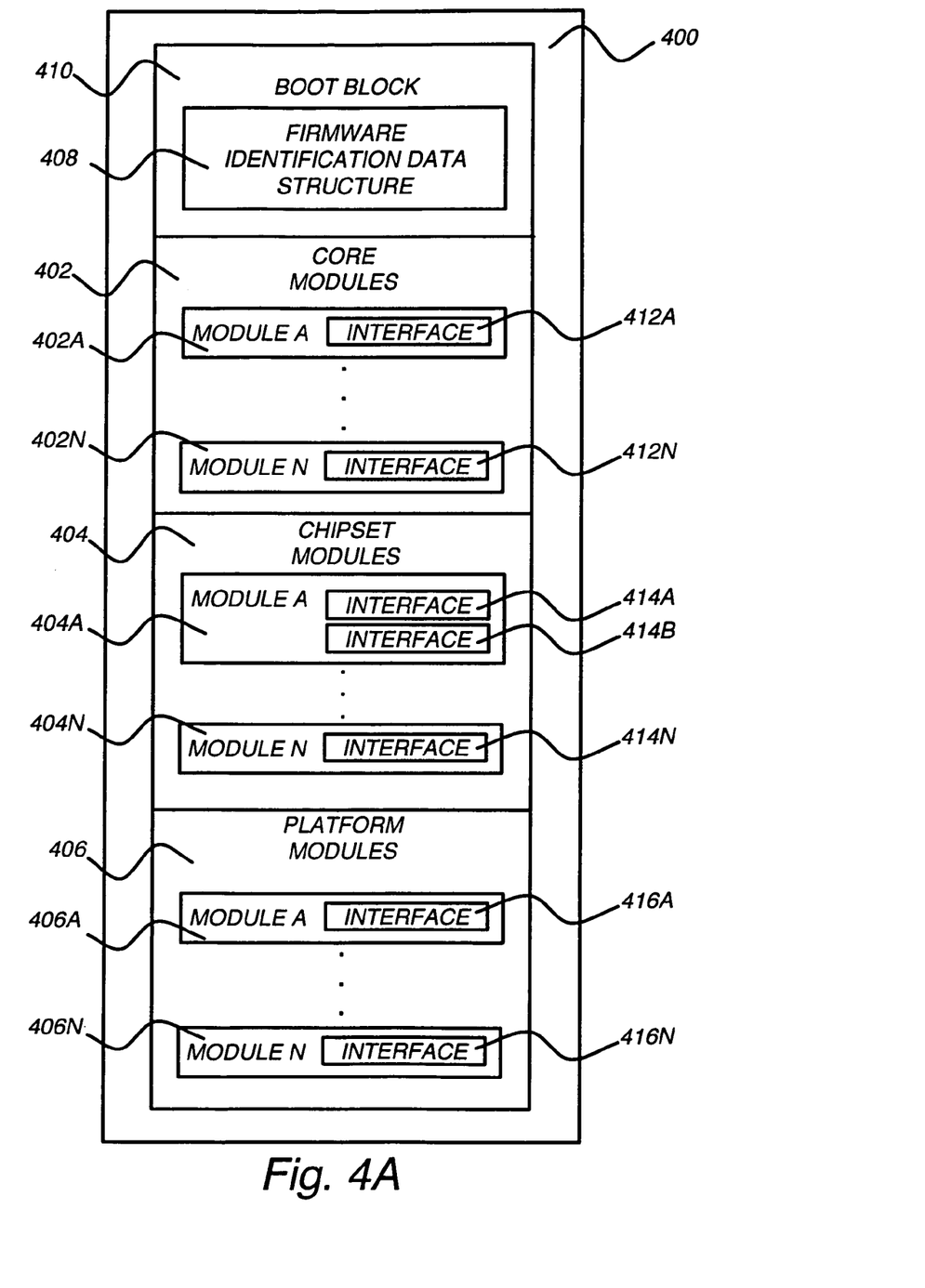
FIG. 4A is a block diagram illustrating categories of firmware program modules that define a firmware according to one embodiment.
Figure 4B:
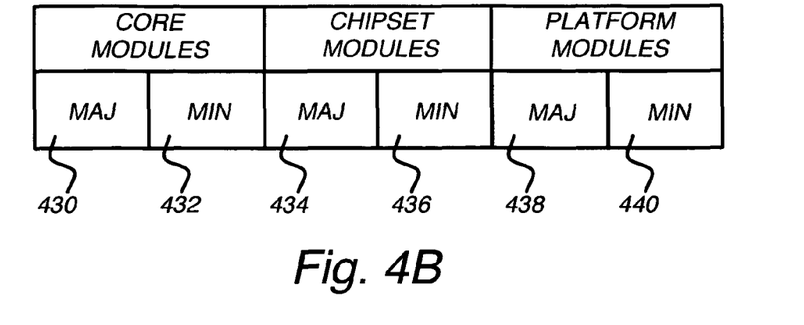
FIG. 4B is a block diagram illustrating a plurality of version numbers corresponding to various categories of firmware program modules according to one embodiment.
Figure 4C:
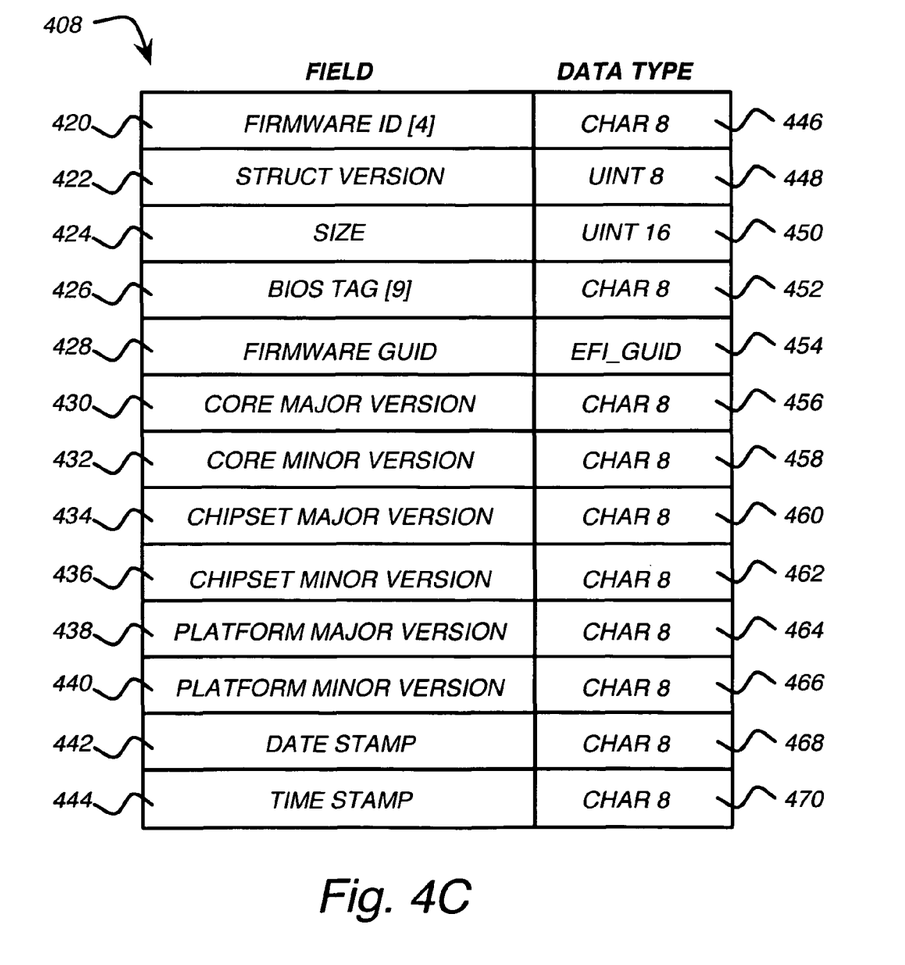
FIG. 4C is a block diagram illustrating a sample firmware identification data structure according to one embodiment.

Referring now to FIGS. 4A-4C, additional details will be provided regarding the embodiments for providing a unique identification for a computer system firmware. In particular, FIG. 4A is a block diagram illustrating various firmware components. The firmware 400 is made up of any number of firmware program modules 402A-402N, 404A-404N, and 406A-406N. Each firmware program module consists of a collection of routines and data structures that performs a particular task. Each firmware program module has at least one interface (see interfaces 412-416 corresponding to firmware program modules 402-406), that lists the constants, data types, variables, and routines that can be accessed by other firmware program modules or routines, as well as an implementation that is private and contains the source code that implements the routines in the firmware program module.

There are different categories of firmware program modules that together comprise the firmware. Core modules 402 are firmware program modules that are common to all hardware manufacturers, chipsets, and platforms. Chipset modules 404 (also called "silicon modules") are firmware program modules that are compatible with the north bridge 106, south bridge 108, and CPU 102. Platform modules 406 are provided by a specific original equipment manufacturer ("OEM"). It should be understood that while firmware program modules are categorized herein as core modules 402, chipset modules 404, and platform modules 406, all of the firmware program modules that define the firmware 400 may be categorized in any number and type of categories. By categorizing the chipset and platform modules, 404 and 406 respectively, separately from the core modules 402, the chipset and platform modules are able to validate the firmware 400 by referencing the version numbers of the core modules 402 in combination with the firmware identification as discussed in detail below.

In order to uniquely identify the version of firmware 400, a firmware identification data structure 408 is created. Firmware identification data structure 408 is a data structure that stores data identifying the major and minor versions of core modules 402, chipset modules 404, and platform modules 406 contained within a specific implementation of the firmware, as well as other data corresponding to firmware 400 as discussed below with respect to FIG. 4C. The firmware identification data structure is stored in a protected portion of the memory device 137 such as the boot block 410 as seen in FIG. 4A. It should be appreciated by those with skill in the art that the firmware identification data structure may be stored in any memory location outside of the boot block as well.

Various firmware program modules may perform various functions or expose various interfaces depending on a global reference number given to the firmware or version numbers given to different sets of firmware program modules. Before exposing a particular interface or set of interfaces, a firmware program module may need to identify a particular major or minor version of a particular set of firmware program modules. For example, a chipset module 404A may expose a first interface 414A according to a specific major version of the core modules 402, but may expose a second interface 414B according to a different major version of the core modules 402.

FIG. 4B is a block diagram illustrating the fields 430-440 of an illustrative firmware identification data structure 408 shown in FIG. 4C. These fields contain version numbers corresponding to various categories of firmware program modules. As shown, a field is provided in the firmware identification data structure 408 for storing a major version identifier and a minor version identifier for each category of firmware program module. Core modules 402 are identified with a major version number stored in the field 430 and a minor version number stored in the field 432. Similarly, chipset modules 404 are identified with a major version number stored in the field 434 and a minor version number stored in the field 436, and platform modules 406 are identified with a major version number stored in the field 438 and a minor version number stored in the field 440. Each major and minor version represents a combination of firmware program modules or sets of firmware program modules. If new firmware program modules are added or deleted, or if firmware program modules are modified, then the appropriate major or minor version numbers must be changed.

It should be understood that the firmware identification data structure 408 may include data relating to any number and type of program module category. Additionally, each category may include major and minor version data, or data corresponding to only a single version without distinguishing between major and minor versions. For example, rather than identifying core, chipset, and platform program module data, the firmware identification data structure 408 may include data corresponding to core, project, and CSM program modules.

If a single firmware program module is modified or an otherwise minor modification is made, the appropriate minor version number is updated. However, if a module is added or deleted, or an otherwise major modification is made, then the corresponding major version number is updated. For example, if various core modules 402 are added to or deleted from the firmware 400 to reconfigure the firmware for a specific system board, then the data stored in the field 430 reflecting the major version number of the core modules 402 is modified to reflect the new firmware. If a single chipset module is changed to reflect a different vendor, then the data stored in the field 436 reflecting the minor version number of the chipset modules 404 may be modified to reflect the minor change to the firmware. Each firmware program module within a firmware 400 may function differently according to a major or minor version number.

TABLE 1 shows program code for implementing a firmware identification data structure 408 according to one embodiment described herein. The firmware identification data structure 408 comprises various components that uniquely identify and describe the firmware 400, allowing firmware program modules and any other applicable firmware applications or components to identify and validate the firmware. This program code defines the firmware identification data structure 408 shown in FIG. 4C. It should be appreciated that the format, order, type, and quantity of the data stored within the fields of the firmware identification data structure 408 may vary. For example, "ChipsetMajorVersion," "ChipsetMinorVersion," "PlatformMajorVersion," and "PlatformMinorVersion" may be replaced with "ProjectMajorVersion," "ProjectMinorVersion," "CsmMajorVersion," and "CsmMinorVersion" or any other desired program module identifiers according to the characteristics of the firmware to which the program code and corresponding firmware identification data structure 408 describe.

TABLE 1

```
typedef struct{
CHAR8            FirmwareID[4]; //Signature '$FID'
UINT8            StructVersion;
UINT16           Size;
CHAR8            BiosTag[9];
EFI_GUID         FirmwareGuid;
CHAR8            CoreMajorVersion[3];
CHAR8            CoreMinorVersion[3];
CHAR8            ChipsetMajorVersion[3];
CHAR8            ChipsetMinorVersion[3];
CHAR8            PlatformMajorVersion[3];
CHAR8            PlatformMinorVersion[3];
CHAR8            DateStamp[40];
CHAR8            Time Stamp[40];
}FW_VERSION
```

Turning now to FIG. 4C, the firmware identification data structure 408 includes fields 420-444, each having firmware identification information, and fields 446-470, each defining the type of data entered into the adjacent field. Starting at field 420, a firmware ID is stored. The firmware ID defines the signature of the data structure. In validating the firmware version, the constituent firmware program modules or other components requiring validation search the memory device 137 for a unique signature string to locate the firmware identification data structure. In the sample shown in TABLE 1, the program code would store the signature '$FID' in field 420.

Next, the firmware identification data structure 408 may contain a structure version identifier stored in field 422 that indicates the latest version of the firmware identification data structure. This structure version identifier stored in field 422 is updated when the firmware identification data structure 408 is updated. The firmware identification data structure 408 may additionally include data stored in a field 424 that defines the size of the firmware identification data structure. Further, the firmware identification data structure 408 includes a BIOS tag stored in field 426. This tag is an 8-digit alphanumeric string that defines the tag number of the firmware 400. This tag varies according to the board and may contain identifiers for the specific motherboard, customer, engineer, or any additional desired information.

A firmware globally unique identifier ("GUID") is assigned to the firmware 400 and stored in field 428 of the firmware identification data structure 408. This GUID is a unique identifier given to the firmware 400. Applications or firmware program modules may utilize this GUID in validating the firmware. The details of the firmware 400 stored within the firmware identification data structure 408 include the major and minor versions of the various categories of firmware program modules. Here, there are major and minor versions of the core modules 402, chipset modules 404, and platform modules 406 stored in fields 430-440 as described above. As discussed above, it should be appreciated that the major and minor version identifiers of the program modules may vary according to the characteristics of the corresponding firmware. For example, the firmware identification data structure 408 could include core module major and minor version data stored in fields 430 and 432, project module major and minor version data stored in fields 434 and 436, and CSM module major and minor version data stored in fields 438 and 440. Finally, the firmware identification data structure 408 may include a date and time stamp stored in fields 442 and 444, which define the build date and time for the firmware version.

Figure 5A:
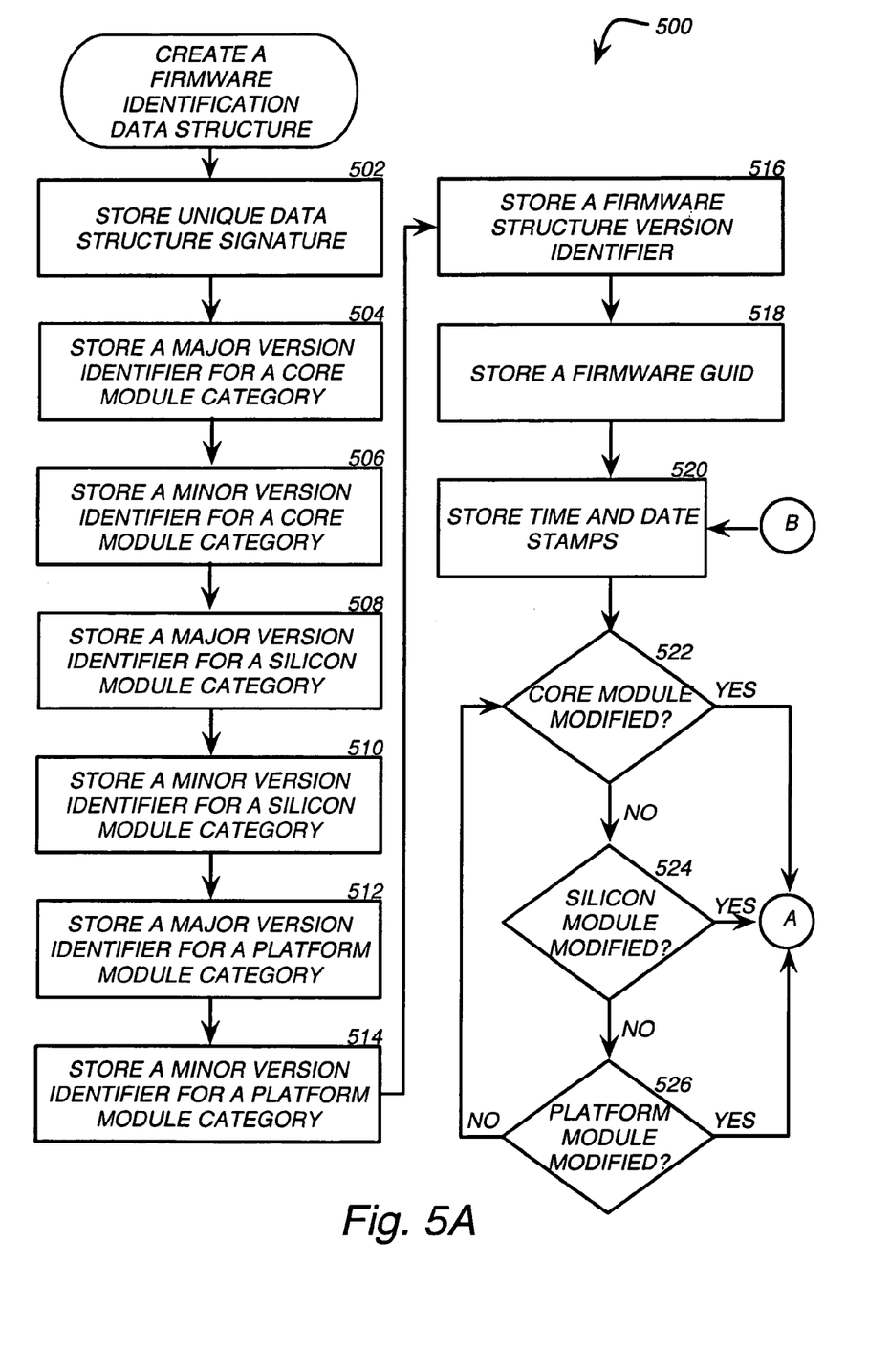
FIGS. 5A and 5B illustrate a flow diagram showing a process for creating a unique firmware identification data structure according to one embodiment.
Figure 5B:
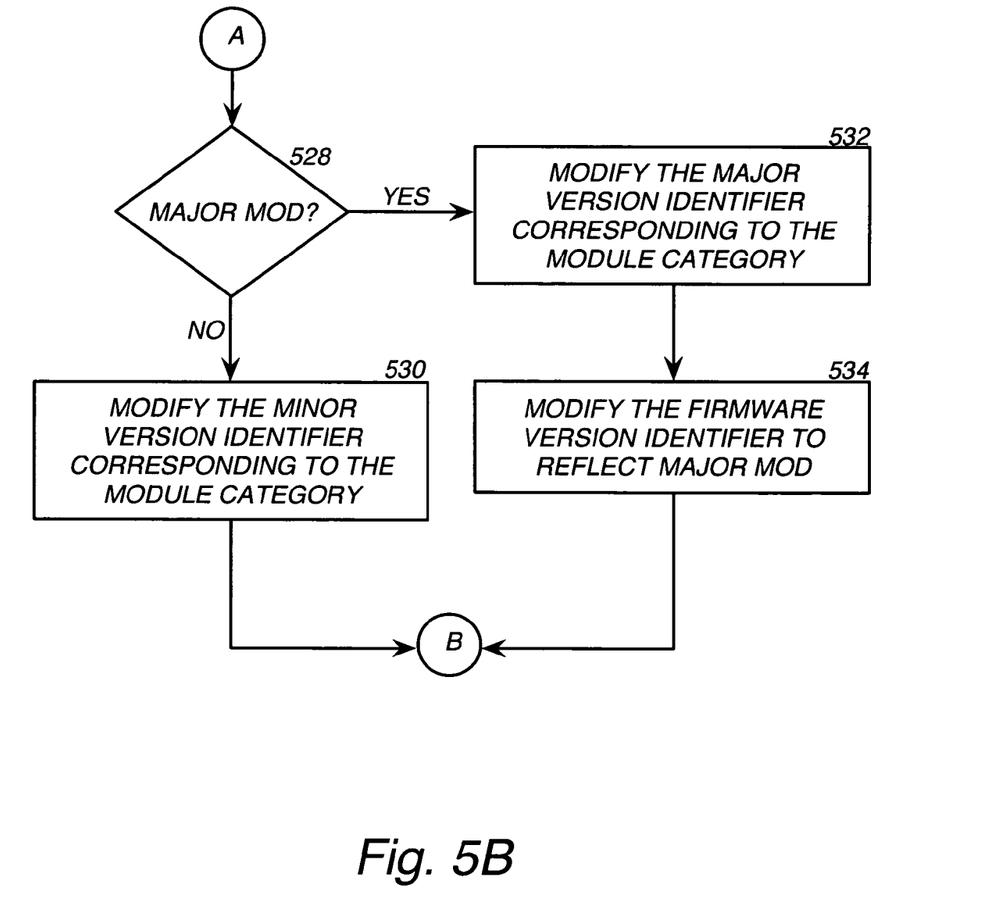

Turning now to FIGS. 5A and 5B, an illustrative routine 500 will be described in detail for creating a unique firmware identification data structure. The logical operations of the various embodiments disclosed herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the embodiments described herein. Accordingly, the logical operations making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 500 begins at operation 502, where a unique data structure signature is generated and stored within field 420 of firmware identification data structure 408 as seen in FIG. 4C. The firmware identification data structure 408 is stored within the boot block 410 of memory device 137 as seen in FIG. 4A. Firmware program modules search for this string in order to locate the firmware identification data structure. At operation 504, an identifier for indicating the current major version of the core modules 402 is generated and stored in field 430 of the firmware identification data structure 408, and at operation 506, an identifier for indicating the current minor version of the core modules is generated and stored in field 432. The routine continues to operation 508, where an identifier for indicating the current major version of the chipset modules 404 is generated and stored in field 434 of the firmware identification data structure 408. At operation 510, an identifier for indicating the current minor version of the chipset modules 404 is generated and stored in field 436.

The routine continues to operation 512, where an identifier for indicating the current major version of the platform modules 406 is generated and stored in field 438 of the firmware identification data structure 408, and operation 514, where an identifier for indicating the current minor version of the platform modules is generated and stored in field 440. It should be appreciated that these version identifiers may be generated and stored in any sequence, independent of the module category or type of version identifier. Likewise, operations 502-520 are not limited to the order shown and may be performed in any sequence as known by those with skill in the art.

Routine 500 continues to operation 516, where a firmware structure version identifier is generated and stored in field 422 of the firmware identification data structure 408. At operation 518, a firmware GUID is generated and stored in field 428 of the firmware identification data structure 408. Date and time stamps are generated and stored at operation 520 in fields 442 and 444 of the firmware identification data structure 408. At operation 522, a determination is made as to whether a core module 402 has been modified. If a core module 402 has been modified, then the routine 500 continues from operation 522 to operation 528. If a core module 402 has not been modified, then a determination is made at operation 524 as to whether a chipset module 404 has been modified. If a chipset module 404 has been modified, then the routine 500 continues from operation 524 to operation 528. If a chipset module 404 has not been modified, then a determination is made at operation 526 as to whether a platform module 406 has been modified. If a platform module 406 has been modified, then the routine 500 continues from operation 526 to operation 528. If a platform module 406 has not been modified, then the routine 500 returns to decision operation 522 and continues.

At operation 528, a determination is made as to whether the modification was a major modification. If the modification was not a major modification, then the minor version identifier corresponding to the module category is modified at operation 530 and the routine returns to operation 520. Returning to operation 528, if the modification is determined to be a major modification, then the major version identifier corresponding to the module category is modified at operation 532. At operation 534, the firmware version identifier is modified to reflect the major modification, and the routine 500 returns to operation 520.

As an example, refer to the firmware identification data structure 408 of FIG. 4C and the procedure for creating a similar data structure described in FIGS. 5A and 5B. The data structure of FIG. 4C includes a firmware identification stored in field 420 as performed by operation 502. The firmware identification data structure 408 further includes major and minor versions of the core, chipset, and platform modules stored in fields 430-440 according to operations 504-514, a firmware GUID stored in field 428 according to operation 518, and date and time stamps stored in fields 442-444 as described by operation 520. The fields of the firmware identification data structure 408 of FIG. 4C may be updated according to operations 522-534 as any of these structures are modified.

Figure 6:
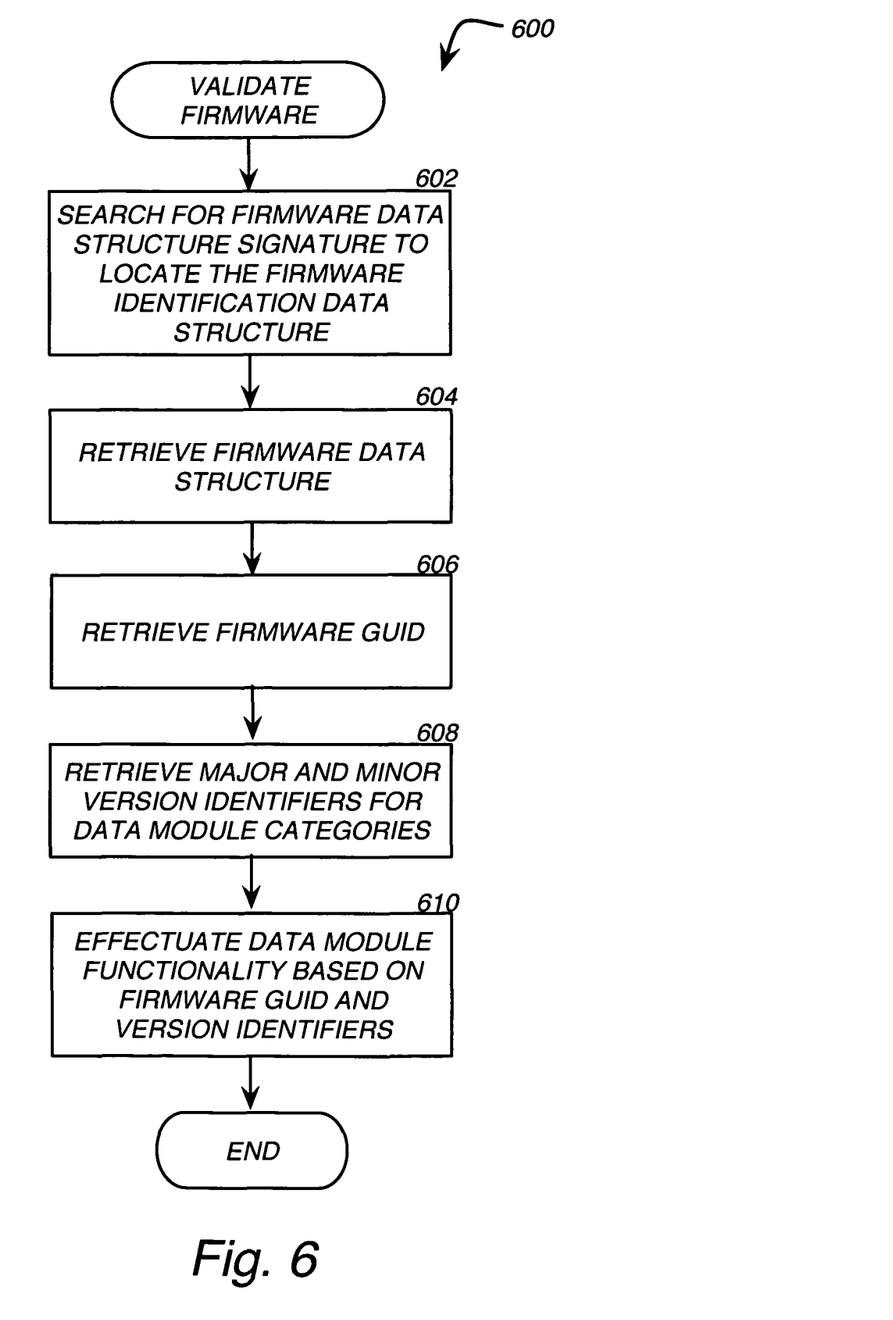
FIG. 6 is a flow diagram illustrating a process for validating firmware.

Turning now to FIG. 6, an illustrative routine 600 will be described in detail for validating a firmware. The routine 600 begins at operation 602, where a firmware program module or other firmware application searches for a firmware identification in order to locate the firmware identification data structure 408. This identification may be a unique signature such as '$FID'. It should be appreciated that any signature may be used to uniquely identify the firmware 400. It should also be appreciated that while the search may be conducted in the boot block 410 portion of the computer memory 137, it may also be performed in any other portion of the computer memory as the firmware identification data structure 408 is not limited to being stored in the boot block 410.

The routine 600 proceeds to operation 604, where the firmware identification data structure 408 that is identified by the signature is retrieved. The firmware GUID is retrieved at operation 606. As described above, the firmware GUID is a unique identifier given to the firmware 400 and may be used by a firmware program module or other firmware application for validation. At operation 608, the major and minor version identifiers for any applicable firmware program module categories are retrieved. The functionality of the validating data module or other firmware application is effectuated according to the applicable version identifiers for the firmware GUID at operation 610 and the routine 600 ends.

Because the functionality of a firmware program module or other firmware application may depend upon the combination and functionality of other firmware program modules that define the firmware 400, the validating firmware program module utilizes the version identifiers to discover the correct combinations and functionality of other firmware program modules within the firmware. For example, a firmware program module may function differently depending upon the combination of core modules 402 within the firmware 400. This firmware program module searches for and receives the major version identifier of the core module 402 category. The firmware program module utilizes this version identifier to determine the correct interfaces to expose to other firmware program modules to effectuate the intended functionality of the firmware 400.

It should be appreciated that the firmware identification data structure 408 may be used by any application to validate the current version of firmware. For example, computer software for re-flashing the computer system firmware could search for the firmware identification data structure, and using the version details stored within the fields of the data structure, could determine the current firmware version and choose the correct version to re-flash.

It should be additionally be appreciated that embodiments described herein provide methods, apparatus, systems, and computer-readable media for creating a firmware identification data structure in a memory device for identifying a firmware and for validating the firmware. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:
1. A method for creating a firmware identification data structure in a memory device for identifying a firmware having a plurality of firmware program modules, comprising:
   storing, in a first data field of the firmware identification data structure a data structure signature identifying the firmware identification data structure;
   storing, in a second data field of the firmware identification data structure, a firmware version identifier corresponding to a current version of the firmware identification data structure;
   storing a plurality of major version identifiers in major version identifier data fields of the firmware identification data structure, each major version identifier corresponding to a current major version of firmware program modules of one of a plurality of categories;
   storing a plurality of minor version identifiers in minor version identifier data fields of the firmware identification data structure, each minor version identifier corresponding to a current minor version of the firmware program modules of one of the plurality of categories, such that the firmware program modules of each of the plurality of categories have a corresponding major version identifier and minor version identifier;
   determining that a modification has been made to at least one firmware program module within at least one of the plurality of categories of the firmware program modules and determining whether the modification is a major modification or a minor modification; and
   responsive to determining that the modification has been made to the at least one firmware program module, modifying data stored in the firmware identification data structure by modifying at least one major version identifier of the plurality of major version identifiers or at least one minor version identifier of the plurality of minor version identifiers to reflect the modification; and
   responsive to determining that the modification is the major modification, modifying the firmware version identifier.

2. The method of claim 1, further comprising storing a globally unique identifier ("GUID") corresponding to the firmware in a third data field of the firmware identification data structure.

3. The method of claim 2, wherein the firmware identification data structure comprises a fourth data field corresponding to a core module category, a fifth data field corresponding to a chipset module category, and a sixth data field corresponding to a platform module category.

4. The method of claim 3, wherein determining that the modification has been made to at least one firmware program module within at least one of the plurality of categories of the firmware program modules and determining whether the modification is the major modification or the minor modification comprises:
   determining that a firmware program module within the core module category has been modified;

responsive to determining that the firmware program module within the core module category has been modified, determining whether the firmware program module within the core module category modification is a major modification;

responsive to determining that no modification has been made to the firmware program module within the core module category, determining whether a firmware program module within the chipset module category has been modified;

responsive to determining that the firmware program module within the chipset module category has been modified, determining whether the firmware program module within the chipset module category modification is a major modification;

responsive to determining that no modification has been made to the firmware program module within the chipset module category, determining whether a firmware program module within the platform module category has been modified; and responsive to determining that the firmware program module within the platform module category has been modified, determining whether the firmware program module within the platform module category modification is a major modification.

5. The method of claim 1, wherein the firmware identification data structure is stored in a boot block of non-volatile memory.

6. The method of claim 1, wherein the firmware identification data structure comprises a third data field corresponding to a core module category, a fourth data field corresponding to a project module category, and a fifth data field corresponding to a CSM module category.

7. The method of claim 1, wherein determining whether the modification is the major modification or the minor modification comprises determining that the modification is the major modification when a firmware program module is added or deleted and determining that the modification is the minor modification when a single firmware program module is modified.

8. A memory for storing data for access by a firmware program module of a computer system firmware, the memory comprising computer-executable instructions which, when executed on a processor, cause a computer to:

store, in a first data field of a firmware identification data structure, a data structure signature identifying the firmware identification data structure;

store, in a second data field of the firmware identification data structure, a firmware version identifier corresponding to a current version of the firmware identification data structure;

store a plurality of major version identifiers in major version identifier data fields of the firmware identification data structure, each major version identifier corresponding to a current major version of firmware program modules of one of a plurality of categories;

store a plurality of minor version identifiers in minor version identifier data fields of the firmware identification data structure, each minor version identifier corresponding to a current minor version of the firmware program modules of one of the plurality of categories, such that the firmware program modules of each of the plurality of categories have a corresponding major version identifier and minor version identifier;

determine that a modification has been made to at least one firmware program module within at least one of the plurality of categories of the firmware program modules and determining whether the modification is a major modification or a minor modification;

responsive to determining that the modification has been made to the at least one firmware program module, modify data stored in the firmware identification data structure by modifying at least one major version identifier of the plurality of major version identifiers or at least one minor version identifier of the plurality of minor version identifiers to reflect the modification; and responsive to determining that the modification is the major modification, modify the firmware version identifier.

9. The memory of claim 8, comprising further computer-executable instructions which, when executed on the processor, cause the computer to store a globally unique identifier ("GUID") corresponding to the computer system firmware in a third data field of the firmware identification data structure.

10. The memory of claim 8, comprising further computer-executable instructions which, when executed on the processor, cause the computer to store:

a date or time identifier indicating the date or time that a latest modification to the firmware identification data structure was performed; and a size identifier indicating a current size of the firmware identification data structure.

11. The memory of claim 8, wherein the firmware identification data structure further comprises:

a third data field corresponding to a core module category, a fourth data field corresponding to a project module category, and a fifth data field corresponding to a CSM module category.

12. The memory of claim 8, wherein the firmware identification data structure further comprises:

a third data field corresponding to a core module category, a fourth data field corresponding to a chipset module category, and a fifth data field corresponding to a platform module category.

13. The memory of claim 12, wherein determining that the modification has been made to at least one firmware program module within at least one of the plurality of categories of the firmware program modules and determining whether the modification is the major modification or the minor modification comprises:

determining that a firmware program module within the core module category has been modified;

responsive to determining that the firmware program module within the core module category has been modified, determining whether the firmware program module within the core module category modification is a major modification;

responsive to determining that no modification has been made to the firmware program module within the core module category, determining whether a firmware program module within the chipset module category has been modified;

responsive to determining that the firmware program module within the chipset module category has been modified, determining whether the firmware program module within the chipset module category modification is a major modification;

responsive to determining that no modification has been made to the firmware program module within the chipset module category, determining whether a firmware program module within the platform module category has been modified; and responsive to determining that the firmware program module within the platform module category has been modified, determining whether the firmware program module within the platform module category modification is a major modification.

14. The memory of claim 8, wherein determining whether the modification is the major modification or the minor modification comprises determining that the modification is the major modification when a firmware program module is added or deleted and determining that the modification is the minor modification when a single firmware program module is modified.

15. The memory of claim 8, wherein the firmware identification data structure is stored in a boot block of non-volatile memory.

16. An apparatus for creating a firmware identification data structure in a memory device, the apparatus comprising:
   a processor; and
   a computer-readable storage medium having computer-executable instructions stored thereupon which, when executed by the processor, cause the apparatus to store, in a first data field of the firmware identification data structure, a data structure signature identifying the firmware identification data structure,
   store, in a second data field of the firmware identification data structure, a firmware version identifier corresponding to a current version of the firmware identification data structure,
   store a plurality of major version identifiers in major version identifier data fields of the firmware identification data structure, each major version identifier corresponding to a current major version of firmware program modules of one of a plurality of categories,
   store a plurality of minor version identifiers in minor version identifier data fields of the firmware identification data structure, each minor version identifier corresponding to a current minor version of the firmware program modules of one of the plurality of categories, such that the firmware program modules of each of the plurality of categories have a corresponding major version identifier and minor version identifier,
   determine that a modification has been made to at least one firmware program module within at least one of the plurality of categories of the firmware program modules and determining whether the modification is a major modification or a minor modification,
   responsive to determining that the modification has been made to the at least one firmware program module, modify data stored in the firmware identification data structure by modifying at least one major version identifier of the plurality of major version identifiers or at least one minor version identifier of the plurality of minor version identifiers to reflect the modification, and
   responsive to determining that the modification is the major modification, modify the firmware version identifier.

17. The apparatus of claim 16, wherein the firmware identification data structure further comprises a third data field corresponding to a globally unique identifier ("GUID").

18. The apparatus of claim 16, wherein the firmware identification data structure further comprises a third data field corresponding to a core module category, a fourth data field corresponding to a project module category, and a fifth data field corresponding to a CSM module category.

19. The apparatus of claim 16, wherein the firmware identification data structure comprises a third data field corresponding to a core module category, a fourth data field corresponding to a chipset module category, and a fifth data field corresponding to a platform module category.

20. The memory of claim 19, wherein determining that the modification has been made to at least one firmware program module within at least one of the plurality of categories of firmware program modules and determining whether the modification is the major modification or the minor modification comprises:
   determining that a firmware program module within the core module category has been modified;
   responsive to determining that the firmware program module within the core module category has been modified, determining whether the firmware program module within the core module category modification is a major modification;
   responsive to determining that no modification has been made to the firmware program module within the core module category, determining whether a firmware program module within the chipset module category has been modified;
   responsive to determining that the firmware program module within the chipset module category has been modified, determining whether the firmware program module within the chipset module category modification is a major modification;
   responsive to determining that no modification has been made to the firmware program module within the chipset module category, determining whether a firmware program module within the platform module category has been modified; and
   responsive to determining that the firmware program module within the platform module category has been modified, determining whether the firmware program module within the platform module category modification is a major modification.

* * * * *